(12) United States Patent
Lee

(10) Patent No.: US 7,418,185 B2
(45) Date of Patent: Aug. 26, 2008

(54) FIXER FOR FIBER BRAGG GRATING SENSOR

(76) Inventor: Geum-Suk Lee, Seongju4-beonji, Seongju-myeon, Boryeong-si, Chungcheongnam-do, 355-910 (KR)

(\*) Notice: Subject to any disclaimer, the term of this patent is extended or adjusted under 35 U.S.C. 154(b) by 0 days.

(21) Appl. No.: 10/565,994

(22) PCT Filed: Jul. 23, 2004

(86) PCT No.: PCT/KR2004/001842

§ 371 (c)(1), (2), (4) Date: Jan. 23, 2006

(87) PCT Pub. No.: WO2005/010462

PCT Pub. Date: Feb. 3, 2005

(65) Prior Publication Data

US 2006/0204199 A1    Sep. 14, 2006

(30) Foreign Application Priority Data

Jul. 24, 2003   (KR) .................. 10-2003-0050812

(51) Int. Cl.
*G02B 6/00*     (2006.01)
(52) U.S. Cl. .................................. 385/137
(58) Field of Classification Search ............... None
See application file for complete search history.

(56) References Cited

U.S. PATENT DOCUMENTS 5,367,591 A * 11/1994 Seike et al. .............. 385/51
5,696,860 A * 12/1997 Semura et al. ............ 385/49

FOREIGN PATENT DOCUMENTS

| JP | 11-173820 | 7/1999 |
|---|---|---|
| JP | 2001-108416 | 4/2001 |
| JP | 2001-281471 | 10/2001 |
| JP | 2002-162211 | 6/2002 |
| JP | 2002162211 A * | 6/2002 |
| JP | 2002-286563 | 10/2002 |
| KR | 1999-0008483 | 5/1993 |
| KR | 1994-0018675 | 8/1994 |
| KR | 10-2001-0016729 | 3/2001 |

\* cited by examiner

*Primary Examiner*—Sung H. Pak
*Assistant Examiner*—Hoang Tran
(74) *Attorney, Agent, or Firm*—J.C. Patents

(57) ABSTRACT

There is provided a fixer for a fiber bragg grating (FBG) sensor, by which the FBG can be installed by any person to provide the FBG sensor with an accurate value, irrespective of a place to be installed, and the FBG sensor can be semi-permanently fixed and protected. The fixer includes a pair of fixing pieces 3 with a bottom surface adhered to the object, in which both ends of the FBG sensor S is inserted and adhered by an adhesive F, a tube 2 for spacing the pair of fixing pieces at regular intervals, in which the FBG sensor S is inserted into a hollow portion of the tube to protect the FBG sensor S from the exterior, and a member for fixing the fixing pieces 3 and the pipe 2, without producing an error of above 0.0002 mm.

14 Claims, 2 Drawing Sheets

[Fig. 1]
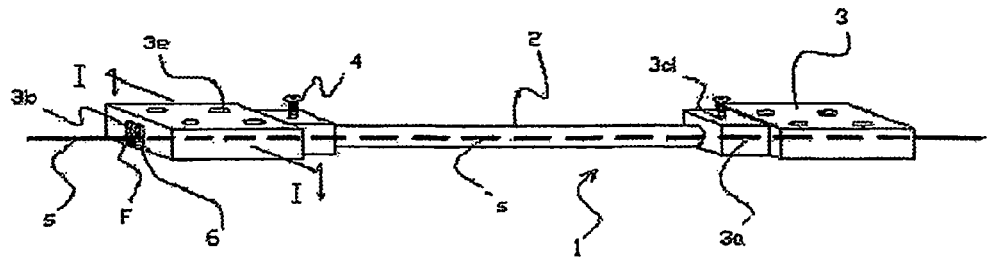
[Fig. 2]
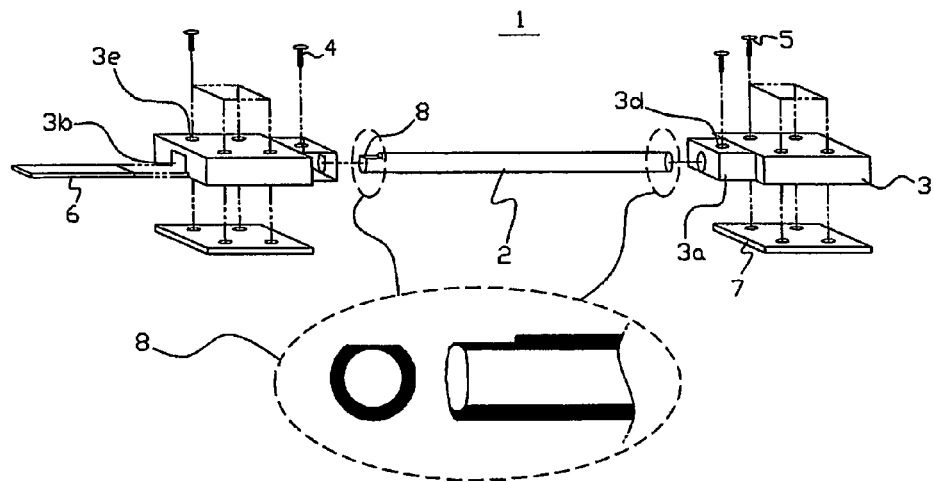
[Fig. 3]
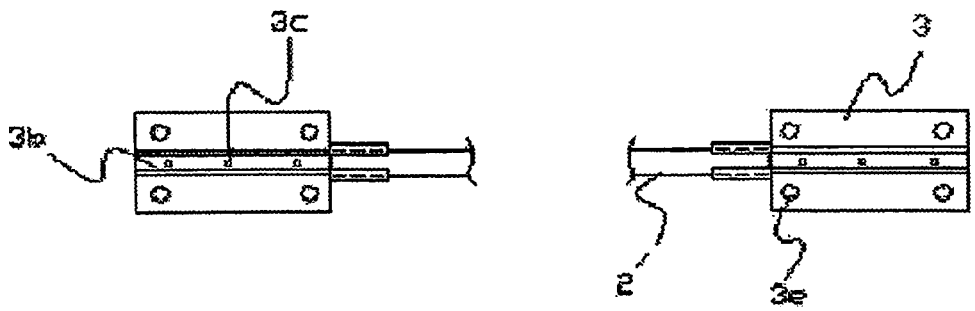

[Fig. 4]
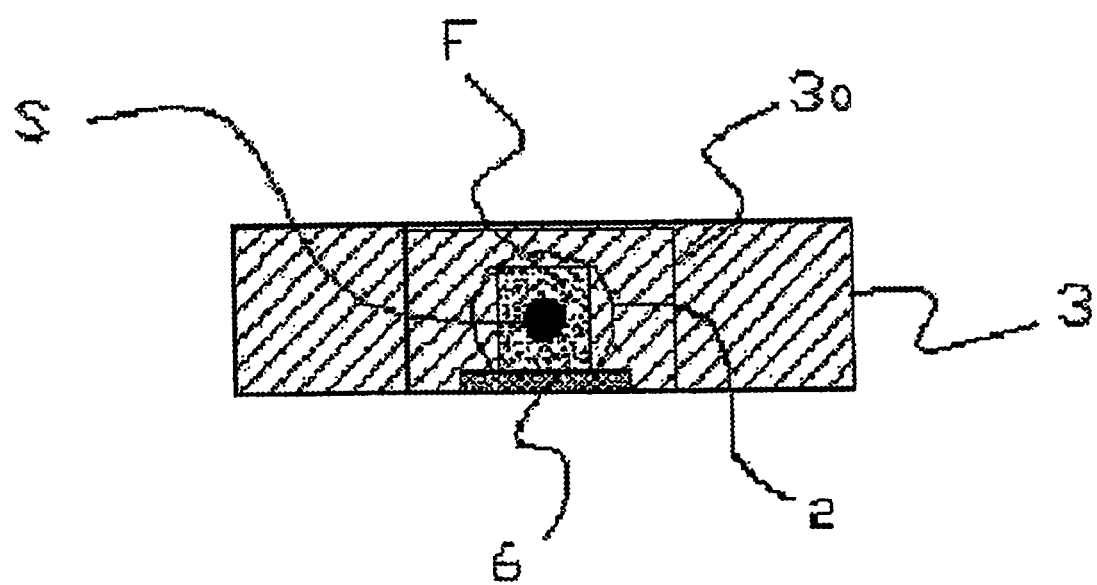

FIXER FOR FIBER BRAGG GRATING SENSOR

TECHNICAL FIELD

The present invention relates to a fixer for a fiber bragg grating sensor (FBG) sensor measuring a wavelength variation, by which the FBG sensor is installed to an object to be measured and an initial set value of the FBG sensor is maintained the fixer, and more particularly, to a fixer having a pair of fixing pieces for securing a tube using a fastening bolt, in which an FBG sensor is inserted into the tube and is secured to the fixing pieces, and which the tube maintains an initial value of the FBG sensor and protects the FBG sensor.

BACKGROUND ART

Generally, a fiber bragg grating (FBG) sensor is a wavelength selective device created by forming a grating that periodically modulates an index of refraction in a glass core of an optical fiber to selectively reflect a specific wavelength.

Since the FBG sensor for measuring physical quantity has good physical properties, for example, it has an inherent wavelength and is not affected by an electromagnetic wave, the FBG sensor substitutes for a conventional electrical gauge. A field of application for the FBG sensor is abruptly increased in recent years.

In spite of a very small diameter of 125 mm, the FBG sensor has a large tension per unit area. Consequently, since the FBG sensor is easily ruptured by an external shock, it is required to exquisitely attach the FBG sensor to buildings or bridges.

In addition, the FBG sensor should be tightly installed to have proper tension, thereby measuring an accurate value. Since there is no proper fixer for the FBG sensor to a civil construction, an experienced engineer should directly set a value of the FBG sensor in a site, which is limited in space-time.

As such, although the FBG sensor has a good measuring performance, it is not widely used in various industrial fields, due to difficult installation and manipulation of the FBG sensor.

Meanwhile, the FBG sensor is directly attached to an object to be measured by an adhesive or an optional fixing piece. Therefore, the FBG sensor is likely to be exposed to external circumstances such as rain, wind, bugs or animals.

The FBG sensor exposed to the external circumstances may wrongly measure a strain, so that it is difficult to constantly inspect civil construction and maintain a measuring system.

DISCLOSURE

Therefore, an object of the present invention is to solve the problems involved in the prior art, and to provide a fixer for a fiber bragg grating (FBG) sensor, by which the FBG can be installed by any person to provide the FBG sensor with an accurate value, irrespective of a place to be installed, and the FBG sensor can be semi-permanently fixed and protected.

According to one aspect of the present invention, there is provided a fixer for fixing a fiber bragg grating (FBG) sensor to an object to be measured to measure a wavelength variation of the object, the fixer including a pair of fixing pieces with a bottom surface adhered to the object, in which both ends of the FBG sensor is inserted and adhered by an adhesive, a tube for spacing the pair of fixing pieces at regular intervals, in which the FBG sensor is inserted into a hollow portion of the tube to protect the FBG sensor from the exterior, and means for fixing the fixing pieces and the pipe.

DESCRIPTION OF DRAWINGS

The above objects, other features and advantages of the present invention will become more apparent by describing the preferred embodiment thereof with reference to the accompanying drawings, in which:

FIG. 1 is a perspective view of a fixer for a fiber bragg grating (FBG) sensor according to one preferred embodiment of the present invention.

FIG. 2 is an exploded view of the fixer in FIG. 1.

FIG. 3 is a bottom view of a fixer for a fiber bragg grating sensor according to another preferred embodiment of the present invention.

FIG. 4 is a cross-sectional view of the fixer in FIG. 1.

BEST MODE

Reference will now be made in detail to preferred embodiments of the present invention, examples of which are illustrated in the accompanying drawings.

A fixer for a fiber bragg grating (FBG) sensor S to measure a strain of an object to be measured, such as building or bridge, according to the present invention, includes a pair of fixing pieces 3 with a bottom surface adhered to the object, in which both ends of the FBG sensor S is inserted and adhered by an adhesive F, a tube 2 for spacing the pair of fixing pieces at regular intervals, in which the FBG sensor S is inserted into a hollow portion of the tube to protect the FBG sensor S from the exterior, and means for fixing the fixing pieces 3 and the pipe 2.

The fixing means includes a tube receiving portion 3*a* protruded from each side of the fixing pieces 3, a threaded hole 3*d* formed on an upper portion of the tube receiving portion, and a fastening bolt 4 threadedly engaged with the threaded hole 3*d* for selectively compressing and fastening the tube 2.

Both ends of the tube 2 are fitted into the tube receiving portions 3*a* between the fixing pieces 3. The FBG sensor S is inserted into the tube 2, and preferably has a degree of clearance so that the FBG sensor S is not restricted between the tube receiving portions 3*a* of the fixing pieces 3.

The fixing piece 3 has a sensor holding groove 3*b* with a bottom surface opened to receive the FBG sensor S, and a cover 6 for selectively opening/closing the sensor holding groove 3*b* at a lower portion of the sensor holding groove.

Specifically, the sensor holding groove 3*b* is formed along a center portion of the fixing piece 3, through which the FBG sensor S passes. The sensor holding groove 3*b* is filled with an adhesive F, with the FBG sensor S being inserted therein. Consequently, the FBG sensor S is fixed at both ends thereof by the adhesive, with tension being applied to the FBG sensor.

Referring to FIG. 3, the sensor holding groove 3*b* is formed with at least one anti-slip groove 3*c* at an inner side thereof. In the case where the adhesive F filled in the sensor holding groove is hardened, it can prevent a clearance form being produced in the sensor holding groove 3*b* due to a coefficient of linear expansion between the fixing piece 3 and the adhesive F.

For example, an epoxy resin may be used as the adhesive.

As described above, if the FBG sensor S is tightly fixed by the sensor holding grooves 3*b* of the fixing pieces 3, the bottom surface of the fixing piece 3 is firmly adhered to the surface of the object to be measured (not shown) by an adhesive.

The fixing piece 3 is provided at the upper surface thereof with at least one through threaded hole 3e. In the case where it is difficult to adhere the bottom surface of the fixing piece 3 to the object to be measured by the adhesive, a fastening bolt 5 is threadedly engaged with a fixing plate 7 attached to the object to be measured via the threaded hole 3e, which firmly fixes the fixing piece 3 to the object to be measured. If necessary, the fixing piece may be reused by unfastening the bolt 5.

After the fixing piece 3 is firmly attached to the surface of the object by use of the fastening bolt 5 and the fixing plate 7 or the adhesive, the engaging state of the FBG sensor S is loosened or released by unfastening the bolt 4 of the tube receiving portion 3a which is installed to maintain the tension of the FBG sensor S, thereby completing the installation of the fixer 1 for the FBG sensor to measure the strain of the object to be measured.

As described above, when the FBG sensor S is completely installed to the surface of the object, the FBG sensor S is safely protected by the tube 2 and the fixing pieces 3 of the fixer 1 from the external circumstances, such as rain, wind or bugs. In addition, there is no variation in the tension with the passage of time, thereby correctly measuring the strain.

When the FBG sensor S is directly used at the site, a method of employing the fixer of the present invention may be changed depending upon a kind of an object to be measured or measuring period. For example, for a short period of up to 1 year, the fixing piece 3 may be directly attached to the object by use of the adhesive. For a long period of above 1 year, the fixing piece 3 may be firmly attached to the object by use of the fastening bolt 5 and the fixing plate 7.

As described above, after securing the fixing piece 3 to the object to be measured, it is preferable that the fastening bolt 4 engaged to the upper portion of the tube 2 is removed. This is to sensitively transfer the strain of the object to the FBG sensor S. At this time, it is possible to measure a strain of up to about 1 ms, according to a test.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

With the above description, according to the present invention, any person can install the FBG with the fixer. In addition, the FBG sensor can be semi-permanently fixed and be protected from the external circumstance.

As such, it can prevent to wrongly measure a strain of the object due to the external circumstances. Also, it is possible to constantly measure the civil constructions, without producing distortion due to an electromagnetic wave. In addition, it can solve a cumbersome in that a conventional electric strain gauge should be installed whenever a periodical safety inspection is performed.

Furthermore, the present invention can reduce time and cost required to install the FBG sensor. Also, it can measure a variation of an inherent wavelength of the FBG sensor, thereby correctly measuring a ratio strain of the object to an initial value and thus exactly measuring a degree of fatigue of the civil construction relative to a conventional measuring system.

The invention claimed is:

1. A fixer for a fiber bragg grating sensor to measure a strain of an object to be measured, the fixer including:
   a pair of fixing pieces for securing the fiber bragg grating sensor to the object, wherein each of the fixing pieces has a sensor holding groove at a bottom surface of the fixing piece, and a tube receiving portion protruded from one side of the fixing piece, which communicates with the sensor holding groove, wherein each fixing piece with the tube receiving portion is an integrate structure in assembly for measuring the strain of the object; and
   a tube enclosing the fiber bragg grating sensor, disposed between the pair of fixing pieces, such that both ends of the tube are detachably secured to each of the tube receiving portions of the fixing pieces by a fastening member,
   wherein the tube is not directly fixed to a surface of the object to be measured; and the fiber bragg grating sensor is inserted into the tube, and both ends of the fiber bragg grating sensor are firmly secured to the sensor holding groove of the fixing piece by an adhesive, and each fixing piece with the tube receiving portion is a single structural body.

2. The fixer as claimed in claim 1, further comprising a cover 6 for closing the sensor holding groove of the fixing piece.

3. The fixer as claimed in claim 1, wherein each of the fixing pieces includes the tube receiving portion protruded from each side of the fixing pieces, a threaded hole is formed on an upper portion of the tube receiving portion for exposing a side surface of the tube, and a fastening bolt is threadedly engaged with the threaded hole for selectively compressing and fastening the tube from the side surface through the thread hole.

4. The fixer as claimed in claim 1, wherein the sensor holding groove is formed with at least one anti-slip groove at an inner side thereof, so that when the adhesive filled in the sensor holding groove is hardened, it prevents a clearance form being produced in the sensor holding groove due to a coefficient of linear expansion between the fixing piece and the adhesive.

5. The fixer as claimed in claim 1, further comprising a fixing plate 7 attached to the object to be measured, so that the fixing piece is detachably secured to the fixing plate of the object by a fastening member.

6. The fixer as claimed in claim 1, wherein the tube inserted into the tube receiving portion is provided at both ends thereof with a tap to easily prevent a rotation of the tube and maintain a horizontal state thereof.

7. The fixer as claimed in claim 1, wherein the pair of fixing pieces is to be fixed on the surface of the object while the tube is not fixed to the surface of the object.

8. A fixer for a fiber bragg grating sensor to measure a strain of an object to be measured, the fixer including:
   a pair of fixing pieces for securing the fiber bragg grating sensor to the object, wherein each of the fixing pieces has a sensor holding groove at a bottom surface of the fixing piece, and a tube receiving portion protruded from one side of the fixing piece, which communicates with the sensor holding groove, wherein each fixing piece with the tube receiving portion is an integrate structure in assembly for measuring the strain of the object; and
   a tube enclosing the fiber bragg grating sensor, disposed between the pair of fixing pieces, such that both ends of the tube are detachably secured to each of the tube receiving portions of the fixing pieces by a fastening member, wherein the tube is not directly fixed to a surface of the object to be measured; and the fiber bragg grating sensor is inserted into the tube, and both ends of the fiber bragg grating sensor are firmly secured to the sensor holding groove of the fixing piece by an adhesive, and the fastening member fixes the tube but not change a tension condition of the fiber bragg grating sensor.

9. The fixer as claimed in claim 8, further comprising a cover 6 for closing the sensor holding groove of the fixing piece.

10. The fixer as claimed in claim 8, wherein each of the fixing pieces includes the tube receiving portion protruded from each side of the fixing pieces, a threaded hole is formed on an upper portion of the tube receiving portion for exposing a side surface of the tube, and a fastening bolt is threadedly engaged with the threaded hole for selectively compressing and fastening the tube from the side surface through the thread hole.

11. The fixer as claimed in claim 8, wherein the sensor holding groove is formed with at least one anti-slip groove at an inner side thereof, so that when the adhesive filled in the sensor holding groove is hardened, it prevents a clearance form being produced in the sensor holding groove due to a coefficient of linear expansion between the fixing piece and the adhesive.

12. The fixer as claimed in claim 8, further comprising a fixing plate attached to the object to be measured, so that the fixing piece is detachably secured to the fixing plate of the object by a fastening member.

13. The fixer as claimed in claim 8, wherein the tube inserted into the tube receiving portion is provided at both ends thereof with a tap to easily prevent a rotation of the tube and maintain a horizontal state thereof.

14. The fixer as claimed in claim 8, wherein the pair of fixing pieces is to be fixed on the surface of the object while the tube is not fixed to the surface of the object.

* * * * *